| | | |
|---|---|---|
| United States Patent [19] | [11] Patent Number: | 4,857,597 |
| Schleifstein | [45] Date of Patent: | Aug. 15, 1989 |

[54] THERMOPLASTIC FORMULATIONS

[75] Inventor: Robert A. Schleifstein, Baton Rouge, La.

[73] Assignee: Ethyl Corporation, Richmond, Va.

[21] Appl. No.: 150,923

[22] Filed: Feb. 1, 1988

[51] Int. Cl.[4] ................................................ C08K 5/34
[52] U.S. Cl. .................................... 525/151; 525/135; 525/905; 524/411; 524/466
[58] Field of Search .................................. 525/151, 905

[56] References Cited

U.S. PATENT DOCUMENTS

| | | | |
|---|---|---|---|
| 3,887,647 | 6/1975 | Yonemitsu et al. | 525/151 |
| 4,067,930 | 1/1978 | Versnel et al. | 525/466 |
| 4,127,559 | 11/1978 | Newcombe | 524/411 |
| 4,430,467 | 2/1984 | Lesniewski et al. | 524/411 |

*Primary Examiner*—Lewis T. Jacobs
*Attorney, Agent, or Firm*—E. E. Spielman, Jr.

[57] ABSTRACT

This invention relates to a thermoplastic formulation having a first part comprising, (i) a blend of a polyphenylene ether and a polyvinyl aromatic and (ii) a nuclear halogenated polyvinyl aromatic flame retardant, and a second part, in admixture with the first part, comprising a Diels-Alder adduct having the formula $$A-R-(A)_n$$

wherein n is 0, 1 or 2 and A is a polyhalogenated cycloalkylene or cycloalkyl group and R is as defined herein.

15 Claims, No Drawings

THERMOPLASTIC FORMULATIONS

BACKGROUND OF THE INVENTION

This invention relates to thermoplastic formulations containing a blend of polyphenylene ether and a vinyl aromatic polymer which are flame retardant and have improved melt flow.

Thermoplastic formulations based upon a blend of a polyphenylene ether and a polyvinyl aromatic are well known. Such formulations are useful in engineering thermoplastic applications.

The polyphenylene ether constituent of the blend is frequently poly(2,6-dimethyl-1,4-phenylene ether) or the 2,5-dimethyl isomer thereof. The polyphenylene ether may also be a copolymer, such as the copolymer produced from 2,6-dimethylphenol and 2,3,6-trimethylphenol. These and other suitable polyphenylene ethers and their preparations are discussed, for example, in U.S. Pat. Nos. 3,306,874, 3,305,875 and 4,011,200, the disclosures of which are incorporated herein by reference.

The polyvinyl aromatic constituent is commonly a polystyrene, such as high-impact polystyrene. The term, "high-impact polystyrene" is used in the art to identify rubber modified polystyrene and is conventionally referred to by the acronym, HIPS. The rubber modifiers which are useful in this application are several in number, with polybutadiene, styrene-butadiene random and block copolymers, and ethylene-propylene diene terpolymers being exemplary. See U.S. Pat. Nos. 4,128,602, 4,128,603 and 4,128,604.

Numerous blends of polyphenylene ethers and polyvinyl aromatics are known. See, for example, U.S. Pat. Nos. 3,383,435, 3,887,646, 3,933,941, 3,994,856, 4,038,343, 4,128,602, 4,128,603 and 4,128,604, the disclosures of which are incorporated herein by reference.

In many applications, engineering thermoplastics are best provided with a flame retardant quality. For formulations based upon polyphenylene ether and polyvinyl aromatic blends, a particularly useful flame retardant for addition to the formulation is nuclear brominated polystyrene. In addition, flame retardant synergists, such as $Sb_2O_3$, are often used in cooperation with such halogenated polyphenylene ethers. While the flame retardancy of such formulations is very high, e.g. a UL-94 rating of V-0, these formulations have a very low melt flow, e.g. a melt index of about 3.0 g/10 min. ASTM 1238. With this low of a melt flow, processing of these formulations is difficult at best and productivity may suffer as a result.

The melt flow of such formulations can be significantly improved by the use of plasticizer-type materials, such as pentaerythritol ester. Such plasticizers are not necessarily a panacea though, as many increase the flammability of the formulation and contribute to a lowering of the heat deflection temperature of articles made from the plasticizer containing formulation.

It is therefore an object of this invention to provide formulations which include a blend of polyphenylene ether and polyvinyl aromatic, a halogenated polyphenylene ether flame retardant, and, optionally, a flame retardant synergist, which formulations have both improved melt flow and high flame retardancy.

THE INVENTION

This invention relates to a thermoplastic formulation having two parts, the first part comprising a blend of polyphenylene ether and a polyvinyl aromatic, and a nuclear halogenated polyphenylene ether flame retardant. The second part is in intimate admixture with the first part and comprises a Diels-Alder adduct having the formula

The A constituent is a polyhalogenated cycloalkylene group having the structure

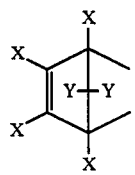

or a polyhalogenated cycloalkyl group having the structure

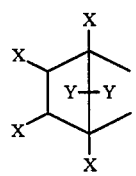

in which each X is independently a chloro, bromo or hydro group and each Y is independently a chloro, bromo, hydro, hydrocarbyl or hydrocarbyloxy group, and in which the total of said X's and Y's which are chloro or bromo groups is at least two.

The identity of R is dependent upon the value for n, which value may be 0, 1 or 2. When n is 0, R is either a divalent saturated cyclic polybromohydrocarbon group having 7 to 20 carbon atoms and 2 to 6 bromine atoms which are paired in vicinal positions, or a group having the structure,

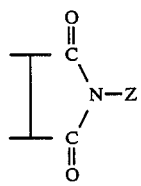

in which Z is a hydro, alkyl, aryl, alkaryl, aralkyl or cycloalkyl group, having up to 8 carbon atoms, or a halogenated derivative thereof.

When n is 1 or 2, R is defined as a tetra- or hexavalent saturated cyclic hydrocarbon group having 7 to 20 carbon atoms and 0 to 4 chlorine or bromine atoms which are paired in the vicinal positions, or a group having the structure,

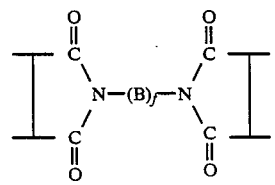

in which f=0 or 1 and B is a alkylene, arylene, alkarylene, aralkylene, cycloalkylene group, having up to 8 carbon atoms, or a halogenated derivative thereof.

The presence of the Diels-Alder adduct, above described, significantly enhances the melt index, as measured by ASTM 1238, of the thermoplastic formulation of this invention. Compare, in the Example portion hereof, the melt index of a formulation comprised of a mixture of a blend of polyphenylene ether and HIPS, and a halogenated polyphenylene ether flame retardant, against those formulations which additionally contain the Diels-Alder adduct. The enhancement in the melt index is achieved without adversely affecting the flame retardancy and without a significant difference between the heat deflection temperature, as measured by ASTM D648, of a formulation comprised of the above-described first part, which is without the Diels-Alder adduct, and a formulation made in accordance with the present invention. This effect is achievable without the utilization of conventional plasticizers, which plasticizers can lower flame retardant qualities and adversely affect heat deflection temperature. This does not mean that plasticizers cannot be utilized in the thermoplastic formulations of this invention, as such plasticizers are permissible in those cases where their presence does not give the thermoplastic formulation such a low quality in regards to flame retardancy and to heat deflection temperature that articles produced therefrom are not acceptable for use. When a plasticizer is used in the thermoplastic formulation it is to be understood that the presence of the Diels-Alder adduct will lower the amount of plasticizer needed and, thus, in that regard reduce the extent to which the flame retardancy and the heat deflection temperature are lowered.

The manner in which the Diels-Alder adduct accomplishes the foregoing beneficial functions is not fully understood. It is theorized, though this invention is not to be restricted by such theory, that the operative constituent in the Diels-Alder adduct is the polyhalogenated cycloalkylene or cycloalkyl group. Under this theory, the identity of the R group is not particularly critical so long as it does not decrease flame retardancy or cause the Diels-Alder adduct to be unstable or too volatile under processing conditions.

The polyphenylene ether-polyvinyl aromatic blend constituent of the first part of the thermoplastic formulation can be any of those previously described herein. Generally, the weight ratio of polyphenylene ether to polyvinyl aromatic is within the range of from about 1:3 to about 2:1. A most useful weight ratio is within the range of from about 1:2 to about 1:1. A preferred polyphenylene ether is poly(2,6-dimethyl-1,4-phenylene ether). A preferred polyvinyl aromatic is HIPS, with polybutadiene modified HIPS being most preferred. Most commercial HIPS contains from about 2 wt.% to about 10 wt.% polybutadiene. Poly(2,6-dimethyl-1,4-phenylene ether) can be purchased pre-blended with HIPS from General Electric Company under the trademark NORYL® 731. Other blends having different weight ratios are also available from General Electric Company. HIPS can be purchased from Huntsman Chemical Corporation, The Dow Chemical Company, etc.

The first part of the thermoplastic formulation of this invention also includes a nuclear halogenated polyvinyl aromatic flame retardant. Such a flame retardant can be represented by the structure,

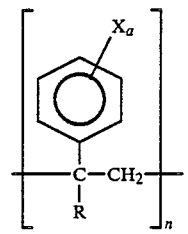

wherein each X is independently a chloro or bromo group, a is an integer from 1 to 3, R is hydrogen or an aliphatic group, particularly an alkyl group such as $CH_3-$ or $C_2H_5-$ and n is the number of repeating units in the polymer. The more common nuclear halogenated polyvinyl aromatics are: 2,3-, 2,4-, 2,5- and 3,4-dibromostyrene and 2,4,5-tribromostyrene. Other polyvinyl aromatics may be used such as 2-chloro-3-bromo-polystyrene, 2-alphamethylethyl-4,5-dibromo-polystyrene, 2-chloro-4,5-dibromo polystyrene. The nuclear halogenated polyvinyl aromatics may be relatively low in molecular weight, i.e. oligomers, n=10 to 100, or of relatively high molecular weight, i.e. polymers, n=300 to 1400. Processes for the preparation of nuclear halogenated poly vinyl aromatics are disclosed in U.S. Pat. Nos. 4,074,032, 4,200,703 and 4,143,221 and in CA 72:38362 (1970). Most preferred nuclear halogenated polyvinyl aromatics are high molecular weight and have 2.7 to 2.8 bromine atoms per aromatic ring. Such can be purchased from Ferro Corp. under the trade name Pyrochek® 68PB.

The Diels-Alder adduct constituent of the second part of the thermoplastic formulation of this invention has, as before recited, the formula $$A-R-(A)_n$$

wherein n=0, 1 or 2. The A constituent of the adduct is provided by the diene while the R constituent is provided by the dieneophile which are reacted with one another in accordance with the Diels-Alder reaction.

The Diels-Alder adducts of this invention are known and may be prepared by known methods which generally include reacting a polyhalocyclopentadiene with a suitable multi-unsaturated dieneophile to form a 1:1, when n=0, a 2:1, when n=1, and a 3:1, when n=2, Diels-Alder adduct. Bromine may then be added to remove any residual unsaturation if present.

When A is of the structure,

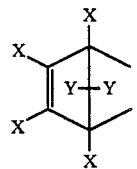

exemplary dienes that may be used in the Diels-Alder reaction are hexachlorocyclopentadiene, hexabromocyclopentadiene, 5,5,-dimethoxytetrachlorocyclopentadiene, 5,5-diethoxy-tetrachlorocyclopentadiene, 5,5-dihydro-tetrachlorocyclopentadiene, 5,5-dibromo-tetrachlorocyclopentadiene, 5-methyl-pentachlorocyclopentadiene, 5-methyl-5-hexyltetrabromocyclopentadiene, 5,5-didecyl-tetrachlorocyclopentadiene, 5- bromoethyl-pentabromocyclopentadiene, 5-decoxy-pentachlorocyclopentadiene, 1,2,3-tribromo-4,5,5-trichlorocyclopentadiene, 2,3,4-tribromo-cyclopentadiene, 1,2-dibromo-3,4,5-trichlorocyclopentadiene, etc.

Of the above described dienes, the most preferred diene is hexachlorocyclopentadiene.

When A is the structure,

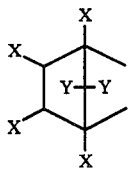

it is preferred to first obtain an intermediate adduct which has a

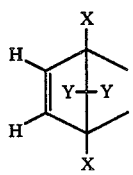

group as the A constituent. Then chlorine or bromine can be added across the double bond.

The identity of R is determined by the dieneophile used in the Diels-Alder reaction. When n=0, and R is a cyclic saturated polybromohydrocarbon group, the dieneophile can be a polybromocycloalkene, such as: 4,5-dibromocyclooctene; 4,5,8,9-tetrabromocyclododecene; 3-[2-(3,4-dibromocyclohexane)ethyl]-cyclohexene; 3,4,5-tribromocyclohexene; 3,4-dibromocyclohexene; etc. In some cases it may be desirable to use a dieneophile which is unhalogenated, i.e. a cycloalkadiene, e.g. cycloocta-1,4-diene, to form the mono adduct. The mono adduct, when first formed, will have unsaturation in the R group. This unsaturation is then brominated to yield the polybromohydrocarbon group. A preferred identity for R is 3,4-dibromocyclooctyl as it is a fairly uncomplex group with relatively easy synthesis.

The other identity of R, when n=0, is a group having the structure,

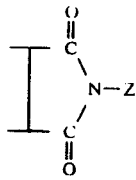

wherein Z is as previously defined. Such an imide group can be provided by the dieneophile, maleic anhydride, which yields an anhydride adduct which is then transformed to the imide adduct by reaction with an amine of the formula $NH_2-(G)$, wherein G is an alkyl, aryl, alkaryl, aralkyl or cycloalkyl group. This imide forming reaction occurs in the presence of a solvent and at a temperature of about 80° C. to about 200° C. The G group can contain up to 8 carbon atoms. Exemplary amines are methylamine, cyclohexylamine, ethylamine, aniline, etc. Preferred imide groups are N-methyl maleimide, N-ethyl maleimide, N-propyl maleimide, N-butyl maleimide, N-phenyl maleimide, N-benzyl maleimide and N-methylphenyl maleimide as they provide only a minimum amount of hydrogen in the adduct, which hydrogen contributes to the fuel value of the adduct. The resultant adduct can be referred to as an imide adduct.

When n is 1 or 2, a di- or tri-adduct is defined and the dieneophile precursor of the R group must provide sufficient polyunsaturation to produce the desired polyadduct. To obtain polyadducts, the following dieneophiles are exemplary when R is a tetra- or hexavalent saturated cyclic hydrocarbon group: 3,4-cycloocta-1,4-diene; cyclododeca-1,6-diene; cyclodeca-1,5-diene; trivinylcyclohexane; cyclododeca-1,5,9-triene, trimethylcyclododecatriene; cyclodeca-1,5,8-triene; etc. It is preferred that the number of unsaturated sites in the chosen dieneophile equal the value of n+1. To fill these unsaturated sites, the molar amount of dieneophile used in the Diels-Alder reaction should then be the product of n+1 and the number of moles of diene reactant used. However, it is possible to use less than this molar amount of dieneophile if the remaining unsaturated sites in the R group of the adduct are subsequently halogenated. A preferred R group, when n is 1, has the structure

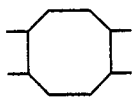

The other group which R can be when n=1 or 2 has the structure,

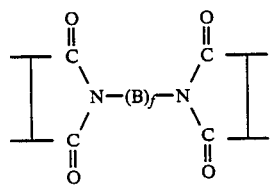

wherein B and f are as previously defined. With this structure for R, R can be referred to as a bis-imide group and the adducts can be referred to as bis-imide adducts. These bis-imide adducts are produced by reacting the A dienes with the same class of dieneophiles used in producing the before-described imide adducts. After the reaction, however, the resultant anhydride adduct is converted to the bis-imide adduct by reacting it with a diamine of the formula $H_2N-(E)_k-NH_2$ wherein E is an alkyl, aryl, alkaryl, aralkyl or cycloalkyl group and k is 0 or 1. The reaction occurs in the presence of a solvent and at a temperature of from about 80° C. to about 200° C. The E groups can contain up to 8 carbon atoms. Exemplary diamines are ethylene diamine, hydrazine, phenylenediamine, diaminocyclohexene, ethylphenylene amine, etc. A most preferred bis-imide group is N,N,-ethylene-bis-(maleimide).

Further details concerning the Diels-Alder adducts of this invention and the processes for their manufacture are recited in U.S. Pat. Nos. 3,761,443; 3,899,463; 3,903,109; 3,917,642; 3,922,316; 3,923,734; 3,950,456; 4,067,930; 4,127,559 and 4,430,467 which are incorporated herein as if fully set forth.

The most preferred Diels-Alder adducts of this invention are: N,N'-dialkyl-bis-(dibromonorbornane-dicarboximide)s and in particular, N,N'-1,2-ethane-bis-(5,6-dibromonorbornane-2,3-dicarboximide) which is sold by Ethyl Corporation under the trademark Saytex® BN-451; 5,6-dibromo-1,10,11,12,13,13-hexachlorotricyclo-[8.2.1.0$^{2,9}$]-tridec-11-ene; and 1,6,7,8,9,14,15,16,17,17,18,18-dodecachloro-pentacyclo[12.2.1.$^{6,9}$.0$^{2,13}$.0$^{5,10}$]octadeca-7,15-diene which is a 2:1 Diels-Alder adduct of hexachlorocyclopentadiene and octadiene sold by Occidental Petroleum, Inc. under the trademark Dechlorane® Plus.

The polyphenylene ether-polyvinyl aromatic blend and the halogenated polyphenylene ether flame retardant, of the first part, are conventionally intimately mixed with the Diels-Alder adducts of this invention, of the second part, by the use of known methods and equipment. For example, a twin screw extruder may be conventionally used.

Although the flame retardant of this invention is efficient, it is frequently desirable to enhance its effectiveness by including one or more synergists, such as the synergists conventionally used with halogenated flame retardants. These synergists include, e.g., oxides, sulfides, or organic acid salts, of antimony. The preferred synergist for use in the formulations of the invention is $Sb_2O_3$. When a synergist is employed, it is usually used in an amount such as to provide a flame retardant/synergist weight ratio of about 1–4.5/1 preferably about 3/1.

Other conventional ingredients may be present in the formulations of this invention, such ingredients including, pigments, lubricants, thermal stabilizers, UV stabilizers, antioxidants, etc. These ingredients are used in conventional amounts.

The formulations of this invention will generally contain from about 70 to about 90 wt.% polyphenylene ether-polyvinyl aromatic blend; from about 3 to about 20 wt.% nuclear halogenated polyvinyl aromatic flame retardant; and from about 1.5 to about 5 wt.% Diels-Alder adduct. A preferred formulation contains from about 80 to about 90 wt.% polyphenylene ether-polyvinyl aromatic blend; from about 4 to about 7 wt.% nuclear halogenated polyvinyl aromatic flame retardant; and from about 3 to about 5 wt.% Diels-Alder adduct. All of the foregoing wt.% figures are based upon the total weight of the formulation. In its smallest concentration, the amount of Diels-Alder adduct present will be that amount needed to enhance the melt index, ASTM 1238, of a composition containing polyphenylene ether-polyvinyl aromatic blend and a nuclear halogenated polyvinyl aromatic flame retardant.

The following examples are given to illustrate the invention and are not intended as a limitation thereof. Unless otherwise specified, quantities mentioned are quantities by weight.

In the following Examples the formulations indicated were used to form molded bars which were used in the tests listed. The formulations were prepared by means of a twin screw mixer operated in a conventional manner. The bars formed from the formulations were obtained by injection molding. For Example I, the injection molding temperature was about 250° C. Examples II–IV were molded at a temperature within the range of 240° C. to 260° C.

Flame retardancy was measured in accordance with UL-94, Vertical Burning Test for Classifying Materials V-0, V-1 or V-2.

The Melt Index test was run in accordance with ASTM 1238 modified to 285° C.

The H.D.T. (heat deflection test) was run in accordance with ASTM D648.

Examples I and II are not of this invention. Example I concerns a formulation which can be defined as the above referred to first part of the formulation of this invention, the first part being that which contains a polyphenylene ether-polyvinyl aromatic blend and a nuclear halogenated polyvinyl aromatic. Example II does not contain the Diels-Alder adducts of this invention but does contain a pentaerythritol ester, a type of compound well-known for its plasticizing properties.

EXAMPLES

| Example No. | Formulation | | UL-94 @ 1/16" | Melt Index g/10 Min. | H.D.T. °F. ⅛" |
|---|---|---|---|---|---|
| I | Noryl ® 731 | 56.9% | V-0 | 3.2 | 214° |
| | HIPS 840D | 28.4% | | | |
| | $Sb_2O_3$ | 3.7% | | | |
| | Brominated Polystyrene | 11.0% | | | |
| II | Noryl ® 731 | 56.9% | V-1 | 5.2 | 193° |
| | HIPS 840D | 28.4% | | | |
| | $Sb_2O_3$ | 3.7% | | | |
| | Brominated Polystyrene | 7.0% | | | |
| | Hatcol ® 5170 | 4.0% | | | |
| III | Noryl ® 731 | 56.9% | V-0 | 6.2 | 215° |
| | HIPS 840D | 28.4% | | | |
| | $Sb_2O_3$ | 3.7% | | | |
| | Brominated Polystyrene | 9.0% | | | |
| | Saytex ® BN-451 | 2.0% | | | |
| IV | Noryl ® 731 | 56.9% | V-0 | 8.4 | 215° |
| | HIPS 840D | 28.4% | | | |
| | $Sb_2O_3$ | 3.7% | | | |
| | Brominated Polystyrene | 7.0% | | | |
| | Saytex ® BN-451 | 4.0% | | | |

Noryl ® is the trademark of General Electric Co.'s polyphenylene oxide - HIPS blends.
HIPS 840D is sold by Huntsman Chemical Corp.
Brominated Polystyrene is the Pyrochek ® 68PB product of Ferro Corp.
Saytex ® BN-451 is Ethyl Corporation's trademark for the flame retardant, N,N'—1,2-ethane-bis-(5,6-dibromonorbornane)-2,3-dicarboximide.
Hatcol ® 5170 is the trademark of Hatco Chemical Corporation for a pentaerythritol ester based formulation.

As can be seen from the above Examples, the absence of a Diels-Alder adduct of this invention in Example I gave a formulation with a low melt index. Those Examples of this invention, i.e. Examples III–IV, show an enhanced melt flow index over that for Example I, while at the same time maintaining a high heat deflection temperature. While the melt index in Example II is improved over that shown for Example I, the sacrifice in heat deflection temperature is significant.

What is claimed:

1. A thermoplastic formulation having:
(a) a first part comprising,
  (i) a blend of polyphenylene ether and a polyvinyl aromatic, and
  (ii) a nuclear halogenated polyvinyl aromatic flame retardant; and
(b) a second part, in admixture with said first part, said second part comprising, a Diels-Alder adduct having the formula, $$A-R-(A)_n$$

wherein
n=0, 1, or 2,
A is a polyhalogenated cycloalkylene group having the structure,

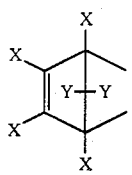

or a polyhalogenated cycloalkyl group having the structure

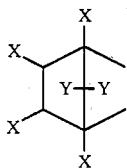

in which each X is independently a chloro, bromo or hydro group and each Y is independently a chloro, bromo, hydro, hydrocarbyl or hydrocarbyloxy group, and the total of said X's and Y's which are chloro or bromo groups, is at least two,
R, when n=0, is a divalent saturated cyclic polybromohydrocarbon group having 7 to 20 carbon atoms and 2 to 6 bromine atoms which are paired in vicinal positions, or a group having the structure,

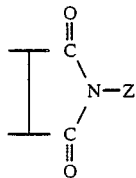

in which Z has up to 8 carbon atoms and is an alkyl, aryl, alkaryl, aralkyl cycloalkyl group, or a halogenated derivative thereof, and
R, when n=1 or 2, is, respectively, tetra- or hexavalent saturated cyclic hydrocarbon group having 7 to 20 carbon atoms and 0 to 4 chloro or bromo atoms which are paired in vicinal positions, or a group having the structure,

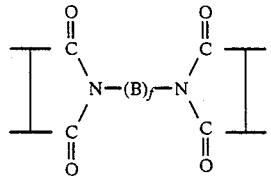

in which f=0 or 1 and B has up to 8 carbon atoms and is an alkylene, arylene, alkarylene, aralkylene, cycloalkene group or a halogenated derivative thereof,
said Diels-Alder adduct being present in an amount sufficient to provide said formulation with a melt index, as measured by ASTM 1238, which is greater than that obtainable with said first portion alone.

2. The thermoplastic formulation of claim 1 wherein said formulation contains from about 70 to about 90 wt.% of said blend, from about 3 to about 20 wt.% of said nuclear halogenated polyvinyl aromatic flame retardant, and from about 1.5 to about 5 wt.% of said Diels-Alder adduct.

3. The thermoplastic formulation of claim 1 wherein said nuclear halogenated polyvinyl aromatic flame retardant is brominated polystyrene.

4. The thermoplastic formulation of claim 1 wherein said Diels-Alder adduct is formed from the Diels-Alder reaction of the diene, hexachlorocyclopentadiene, and a dieneophile precursor for R.

5. The thermoplastic formulation of claim 1 wherein n=0 and said Diels-Alder adduct is formed from the Diels-Alder reaction of a diene precursor for A, and the dieneophile, 4,5-dibromocyclooctene.

6. The thermoplastic formulation of claim 1 wherein n=0 and said Diels-Alder adduct is formed from the Diels-Alder reaction of from a diene precursor for A, and the dieneophile, cycloocta-1,4-diene followed by bromination of the double bond in the R constituent.

7. The thermoplastic formulation of claim 1 wherein n=1 and said Diels-Alder adduct is formed from the Diels-Alder reaction of a diene precursor for A, and the dieneophile, cycloocta-1,4-diene and wherein the molar ratio of the diene precursor for A to the dieneophile is 2 to 1.

8. The thermoplastic formulation of claim 1 wherein n=1 and said Diels-Alder adduct is formed from the Diels-Alder reaction of a diene precursor for A, and the dieneophile, maleic anhydride, followed by the conversion of the resultant Diels-Alder anhydride by the reaction with ethylenediamine.

9. The thermoplastic formulation of claim 1 wherein said Diels-Alder adduct is N,N'-1,2-ethane-bis-(5,6-dibromonorbornane-2,3-dicarboximide).

10. The thermoplastic formulation of claim 1 wherein said Diels-Alder adduct is 5,6-dibromo-1,10,11,12,13,13-hexachlorotricyclo[8.2.1.0$^{2,9}$]-tridec-11-ene.

11. The thermoplastic formulation of claim 1 wherein said Diels-Alder adduct is 1,6,7,8,9,14,15,16,17,17,18,18-dodecachloro-penta-cyclo[12.2.1.1.$^{6,9}$.0$^{2,13}$.0$^{5,10}$]octadeca-7,15-diene.

12. An injection molded article formed from the thermoplastic formulation of claim 1.

13. An injection molded article formed from the thermoplastic formulation of claim 9.

14. An injection molded article formed from the thermoplastic formulation of claim 10.

15. An injection molded article formed from the thermoplastic formulation of claim 11.

* * * * *